(12) United States Patent
Galiano et al.

(10) Patent No.: US 10,748,505 B1
(45) Date of Patent: Aug. 18, 2020

(54) SYSTEM AND METHOD OF DETERMINING COLORS OF A USER INTERFACE

(71) Applicant: Dell Products L.P., Round Rock, TX (US)

(72) Inventors: Alexander Galiano, Miami Beach, FL (US); Erik Peter Summa, Austin, TX (US); Brent Alexander Biglin, San Antonio, TX (US); Uriah Ray Shadle, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/292,465

(22) Filed: Mar. 5, 2019

(51) Int. Cl.
*G09G 5/02* (2006.01)
*G06T 7/90* (2017.01)
*G06T 11/00* (2006.01)

(52) U.S. Cl.
CPC .......... *G09G 5/026* (2013.01); *G06T 7/90* (2017.01); *G06T 11/001* (2013.01); *G06T 2207/10024* (2013.01); *G09G 2320/0666* (2013.01); *G09G 2340/12* (2013.01); *G09G 2360/16* (2013.01)

(58) Field of Classification Search
None
See application file for complete search history.

(56) References Cited

U.S. PATENT DOCUMENTS 6,028,960 A * 2/2000 Graf ................... G06K 9/00268
382/100
10,319,116 B1 * 6/2019 C ........................ G06F 3/04845
2004/0080670 A1 * 4/2004 Cheatle .................. G06T 11/60
348/441
2014/0075324 A1 * 3/2014 Howard .................. H04L 12/18
715/738
2018/0301113 A1 * 10/2018 Clawges .................. G09G 5/06

OTHER PUBLICATIONS

W3C, "G18: Ensuring that a contrast ratio of at least 4.5:1 exists between text (and images of text) and background behind the text," Retrieved from url: https://www.w3.org/TR/WCAG20-TECHS/G18.html, 2016; 4 pages.
Web Content Accessibility Guidelines 2.0, B. Caldwell, M. Cooper, L. Guarino, G. Vanderheiden, Editors, W3C Recommendation, Dec. 11, 2008, http://www.w3.org/TR/2008/REC-WCAG20-20081211/. The latest version of WCAG 2.0 is available at http://www.w3.org/TR/WCAG20/; 29 pages, Dec. 11, 2008.

* cited by examiner

*Primary Examiner* — Aaron M Richer
(74) *Attorney, Agent, or Firm* — Baker Botts L.P.

(57) ABSTRACT

In one or more embodiments, one or more methods, procedures, and/or systems may determine multiple most utilized colors of an image; may determine multiple lightness values respectively associated with the multiple most utilized colors of the image; may determine a lightness value of the multiple lightness values that is within a range of lightness values and a saturation value respectively associated with the lightness value that is above a threshold value; may determine a color of the multiple most utilized colors that is associated with the lightness value and with the saturation value as a dominant color; may repeatedly darken the dominant color by an amount until a ratio between a relative luminance value of a foreground color and a relative luminance value of the dominant color is within a range of a target ratio; and may utilize the dominant color as a background color.

14 Claims, 7 Drawing Sheets

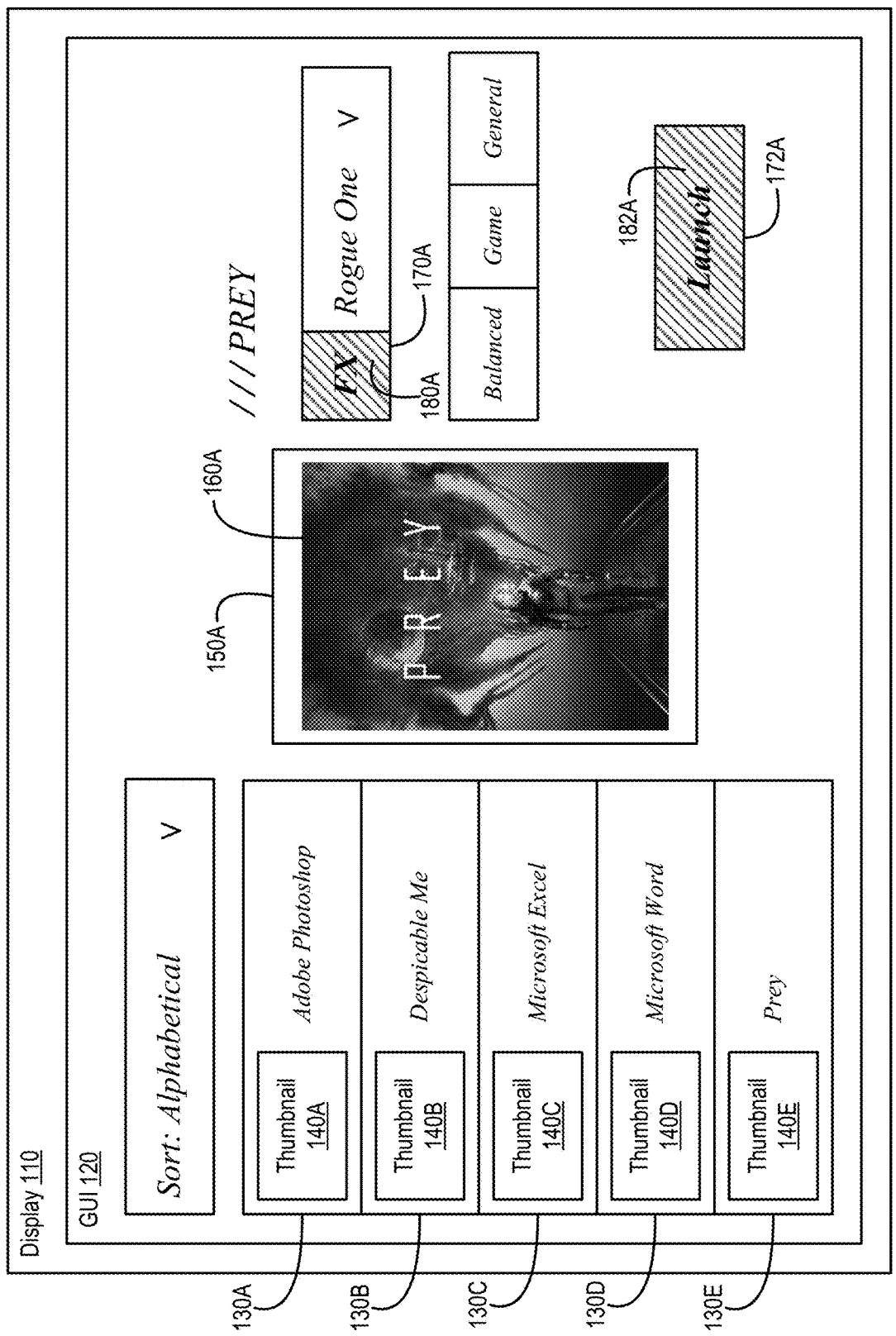

SYSTEM AND METHOD OF DETERMINING COLORS OF A USER INTERFACE

BACKGROUND

Field of the Disclosure

This disclosure relates generally to information handling systems and more particularly to determining colors of a user interface.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more methods, procedures, and/or systems may determine multiple most utilized colors of an image; may determine multiple lightness values respectively associated with the multiple most utilized colors of the image; may determine multiple saturation values respectively associated with the multiple most utilized colors of the image and respectively associated with the multiple lightness values; may determine if a lightness value of the multiple lightness values is within a range of lightness values and if a saturation value respectively associated with the lightness value is above a threshold value; if the lightness value of the multiple lightness values is not within the range of lightness values or if the saturation value respectively associated with the lightness value is not above the threshold value, may determine a mean color from the multiple most utilized colors of the image as a dominant color; if the lightness value of the multiple lightness values is within the range of lightness values and if the saturation value respectively associated with the lightness value is above the threshold value, may determine a color of the multiple most utilized colors of the image that is associated with the lightness value of the multiple lightness values within the range of lightness values and with the saturation value respectively associated with the lightness value as the dominant color; may repeatedly darken the dominant color by an amount until a ratio between a relative luminance value of a foreground color and a relative luminance value of the dominant color is within a range of a target ratio; and may utilize the dominant color as a background color.

In one or more embodiments, utilizing the dominant color as the background color may include displaying glyphs of a font in a font color on a background with the dominant color as the background color. In one or more embodiments, repeatedly darkening the dominant color by the amount until the ratio between the relative luminance value of the foreground color and the relative luminance value of the dominant color is within the range of the target ratio may include subtracting an integer from each of a red eight-bit value associated with the dominant color, a green eight-bit value associated with the dominant color, and a blue eight-bit value associated with the dominant color. For example, the integer may be one. In one or more embodiments, utilizing the dominant color as the background color may include utilizing the dominant color for a boarder color of a boarder that surrounds the image. In one or more embodiments, the one or more methods, procedures, and/or systems may further determine the relative luminance value of the dominant color. In one or more embodiments, the one or more methods, procedures, and/or systems may further determine the relative luminance value of the foreground color.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIGS. 1A-1C illustrate examples of a graphical user interface, according to one or more embodiments;

DETAILED DESCRIPTION

Figure 1B:
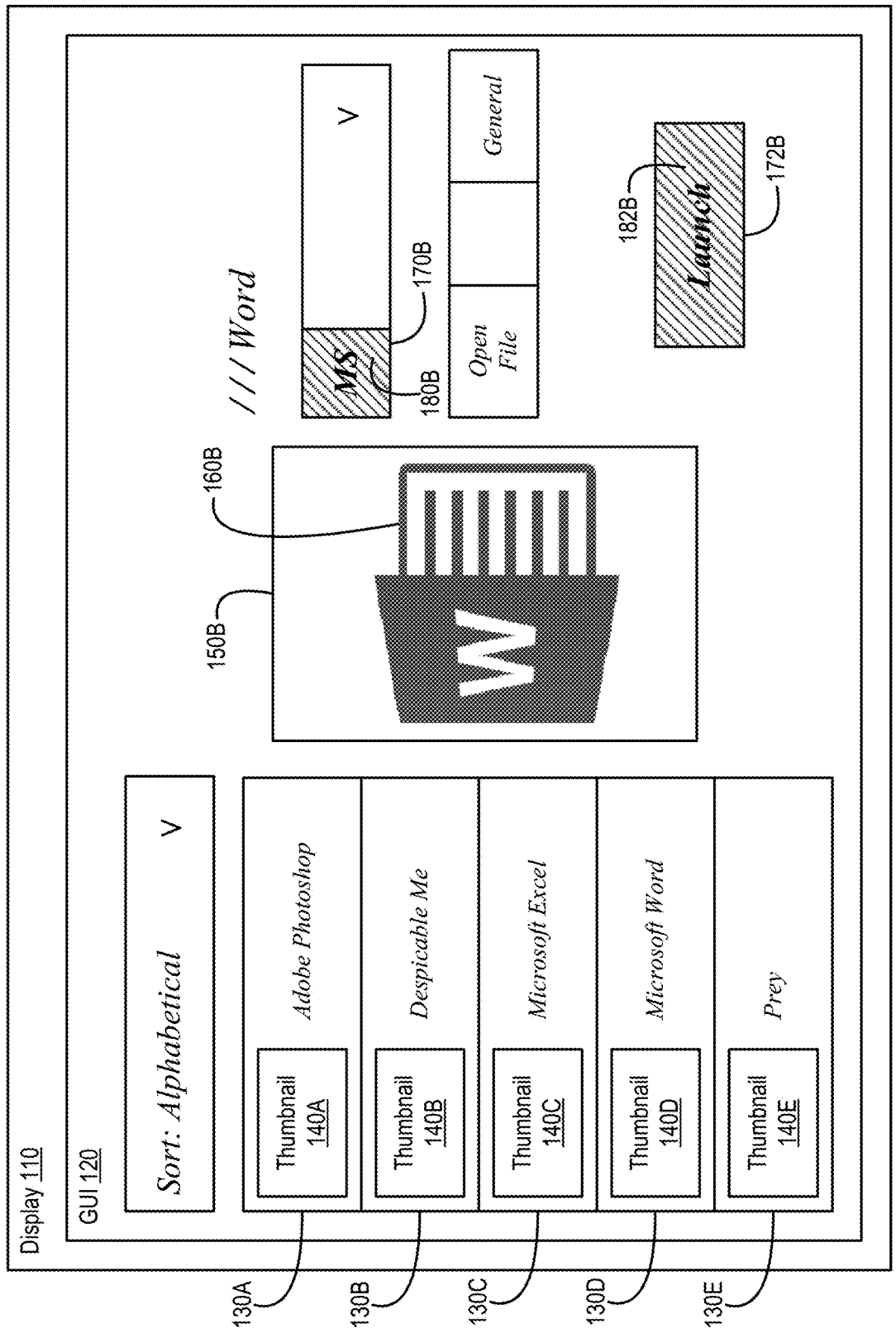

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, customized color lighting may be utilized. For example, an information handling system may provide, via a display, light emissions of one or more colors that may complement a game that a user is playing. In one or more embodiments, customized colors that may complement a user interface (UI) element may be utilized in one or more user interfaces (UIs). In one example, customized colors that may complement a game cover of a game library may be utilized in a game library interface. In a second example, customized colors that may complement a cover of movie or television series may be utilized in a video library interface. In another example, customized colors that may complement a cover of an application may be utilized in a video library interface. In one or more embodiments, one or more members of a library may be stored locally by the information handling system. In one or more embodiments, one or more members of a library may be stored remotely. For example, the information handling system may access the one or more members of the library via a network.

In one or more embodiments, an image may include multiple different colors. For example, the multiple different colors may be utilized throughout the image. For instance, one or more of the multiple different colors may be utilized more than once at different places in the image. In one or more embodiments, a color may be represented by RGB (red, green, blue) values. For example, the color may be represented by a three dimensional vector (R, G, B). For instance, each of R, G, and B may be an eight-bit value (e.g., a range of zero to two hundred and fifty five (0-255)).

In one or more embodiments, a RGB color may be represented by HSL (hue, saturation, lightness). In one or more embodiments, each color of an image may be converted to a HSL representation of the color. For example, the color may be represented by a three dimensional vector (H, S L). For instance, each of H, S, and L may respectively include a range of zero to three hundred and sixty (0-360), a range of zero to one hundred percent (0%-100%), and a range of zero to one hundred percent (0%-100%). In one or more embodiments, each of H, S, or L may include a number. In one example, each of H, S, or L may include an integer. In a second example, each of H, S, or L may include a quotient. In another example, each of H, S, or L may include a real number (e.g., a floating point number).

Figure 1C:
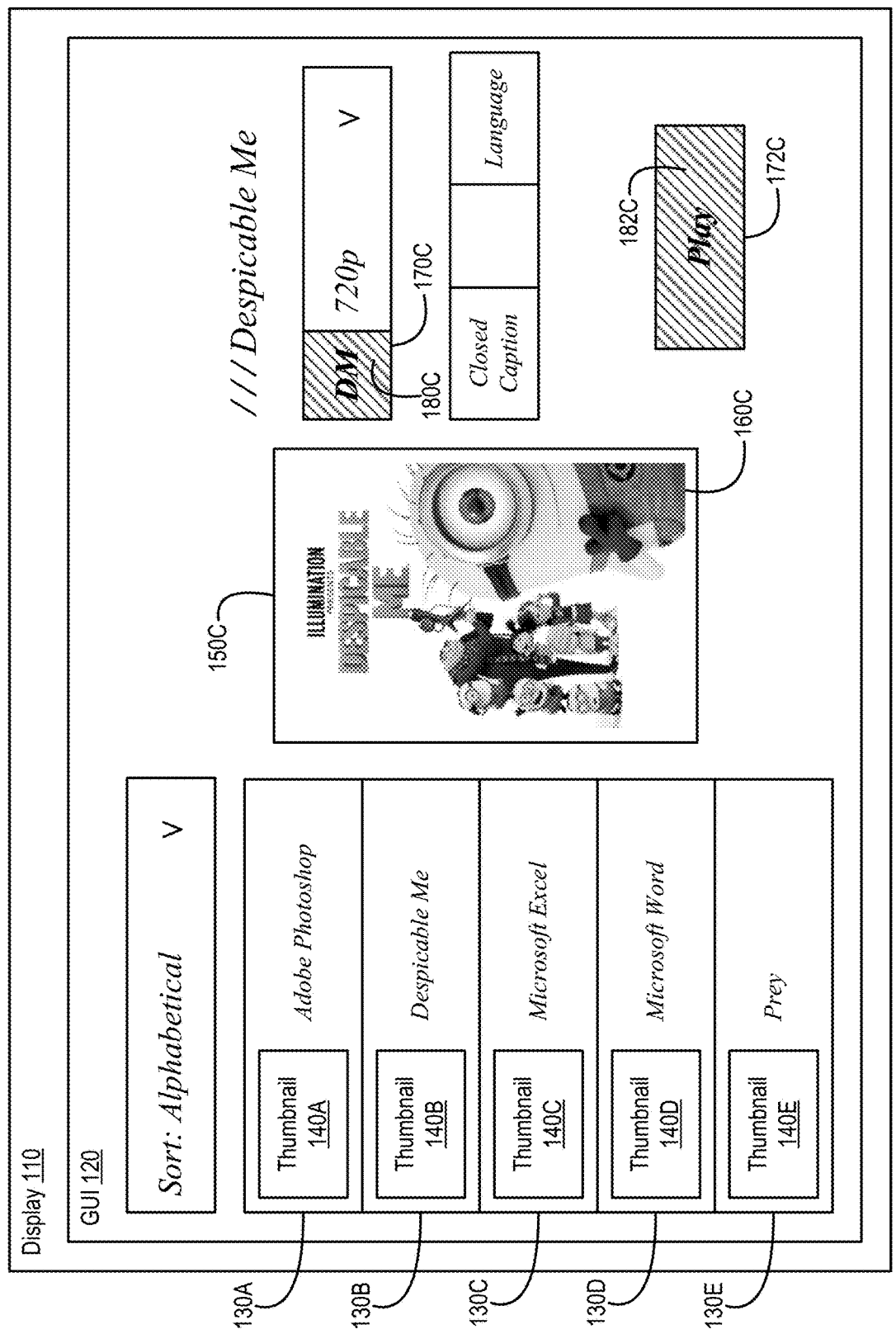

Turning now to FIGS. 1A-1C, examples of a graphical user interface are illustrated, according to one or more embodiments. As shown, a display 110 may display a graphical user interface (GUI) 120. In one or more embodiments, GUI 120 may display one or more GUI elements. As illustrated, GUI 120 may display menu items 130A-130E. As shown, menu items 130A-130E may respectively include thumbnails 140A-140E. As illustrated, menu items 130A-130E display text associated with the menu item. In one example, menu item 130A may display "Adobe Photoshop". For instance, menu item 130A may be associated with an Adobe Photoshop application (APP). In a second example, menu item 130B may display "Despicable Me". For instance, menu item 130B may be associated with a movie entitled Despicable Me. In a third example, menu item 130C may display "Microsoft Excel". For instance, menu item 130C may be associated with a Microsoft Excel APP. In a fourth example, menu item 130D may display "Microsoft Word". For instance, menu item 130D may be associated with a Microsoft Word APP. In another example, menu item 130E may display "Prey". For instance, menu item 130E may be associated with a game entitled "Prey".

As shown in FIG. 1A, GUI 120 may display a cover 150A. For example, menu item 130E may have been selected. For instance, cover 150A may be an expansion of thumbnail 140E. As illustrated, cover 150A may include an image 160A. For example, image 160A may include multiple different colors. As shown, GUI 120 may display GUI elements 170A and 172A. In one or more embodiments, a color of a background of one or more of GUI elements 170A and 172A may be or include a dominant color of image 160A. For example, the dominant color of image 160A may be or include a dark orange. In one instance, the dominant color may provide a contrast for a font color of GUI element 170A. In a second instance, a background 180A may be or include the dominant color. In a third instance, the dominant color may provide a contrast for a font color of GUI element 172A. In another instance, a background 182A may be or include the dominant color.

As illustrated in FIG. 1B, GUI 120 may display a cover 150B. For example, menu item 130D may have been selected. For instance, cover 150B may be an expansion of thumbnail 140D. As shown, cover 150B may include an image 160B. For example, image 160B may include multiple different colors. As illustrated, GUI 120 may display GUI elements 170B and 172B. In one or more embodiments, a color of a background of one or more of GUI elements 170B and 172B may be or include a dominant color of image 160B. For example, the dominant color of image 160B may be or include a dark blue. In one instance, the dominant color may provide a contrast for a font color of GUI element 170B. In a second instance, a background 180B may be or include the dominant color. In a third instance, the dominant color may provide a contrast for a font color of GUI element 172B. In another instance, a background 182B may be or include the dominant color.

As shown in FIG. 1C, GUI 120 may display a cover 150B. For example, menu item 130C may have been selected. For instance, cover 150C may be an expansion of thumbnail 140C. As illustrated, cover 150C may include an image 160C. For example, image 160C may include multiple different colors. As shown, GUI 120 may display GUI elements 170C and 172C. In one or more embodiments, a color of a background of one or more of GUI elements 170C and 172C may be or include a dominant color of image 160C. For example, the dominant color of image 160C may be or include yellow. In one instance, the dominant color may provide a contrast for a font color of GUI element 170C. In a second instance, a background 180C may be or include the dominant color. In a third instance, the dominant color may provide a contrast for a font color of GUI element 172C. In another instance, a background 182C may be or include the dominant color.

Figure 2:
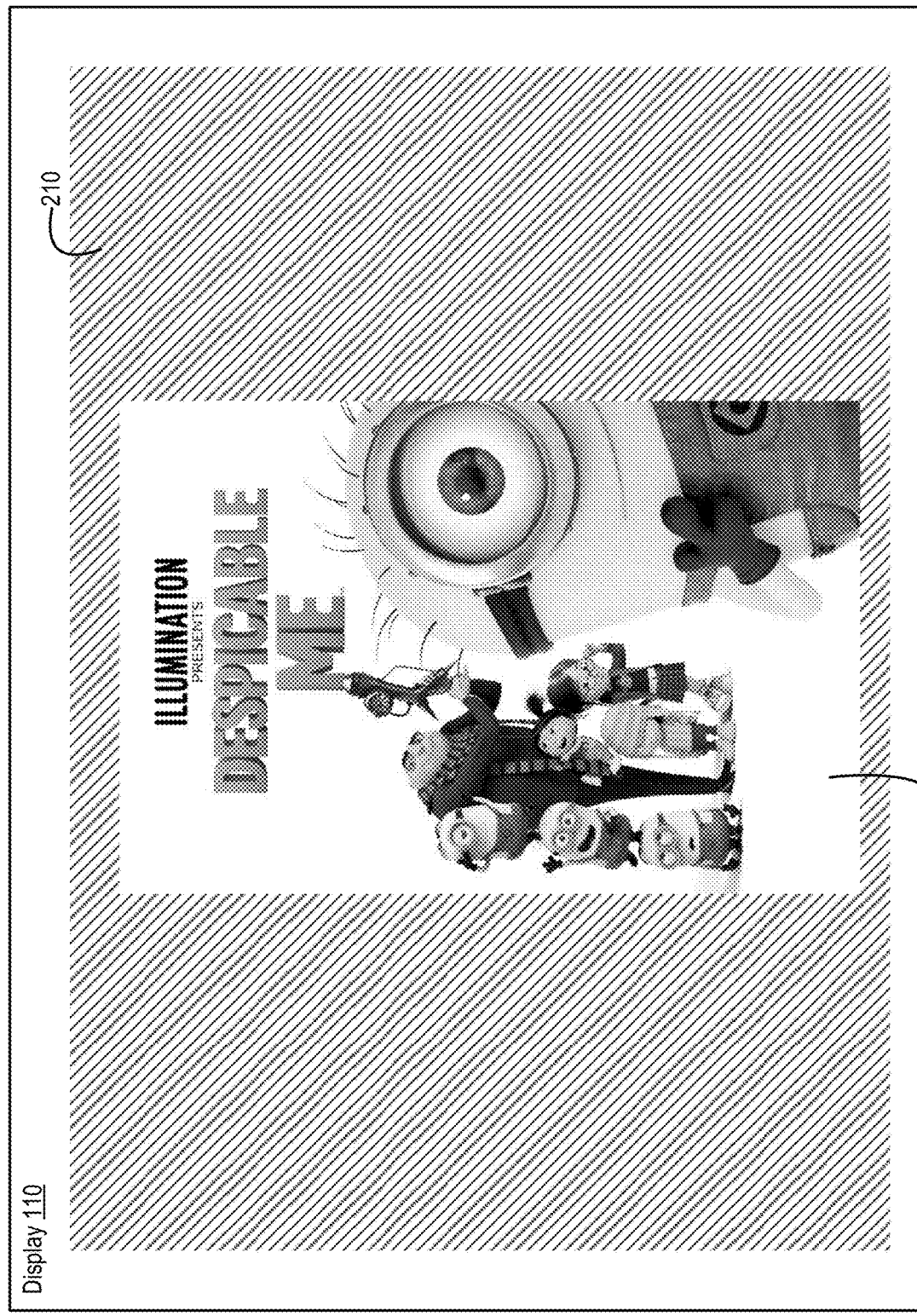
FIG. 2 illustrates an example of utilizing a dominant color as a background color, according to one or more embodiments.

Turning now to FIG. 2, an example of utilizing a dominant color as a background color is illustrated, according to one or more embodiments. As shown, display 110 may display image 160C. As illustrated, display 110 may display a background 210. For example, background 210 may be a background for image 160C. In one or more embodiments, a color of background 210 may be or include a dominant color. For example, the color of background 210 may be or include a dominant color associated with image 160C.

Figure 3:
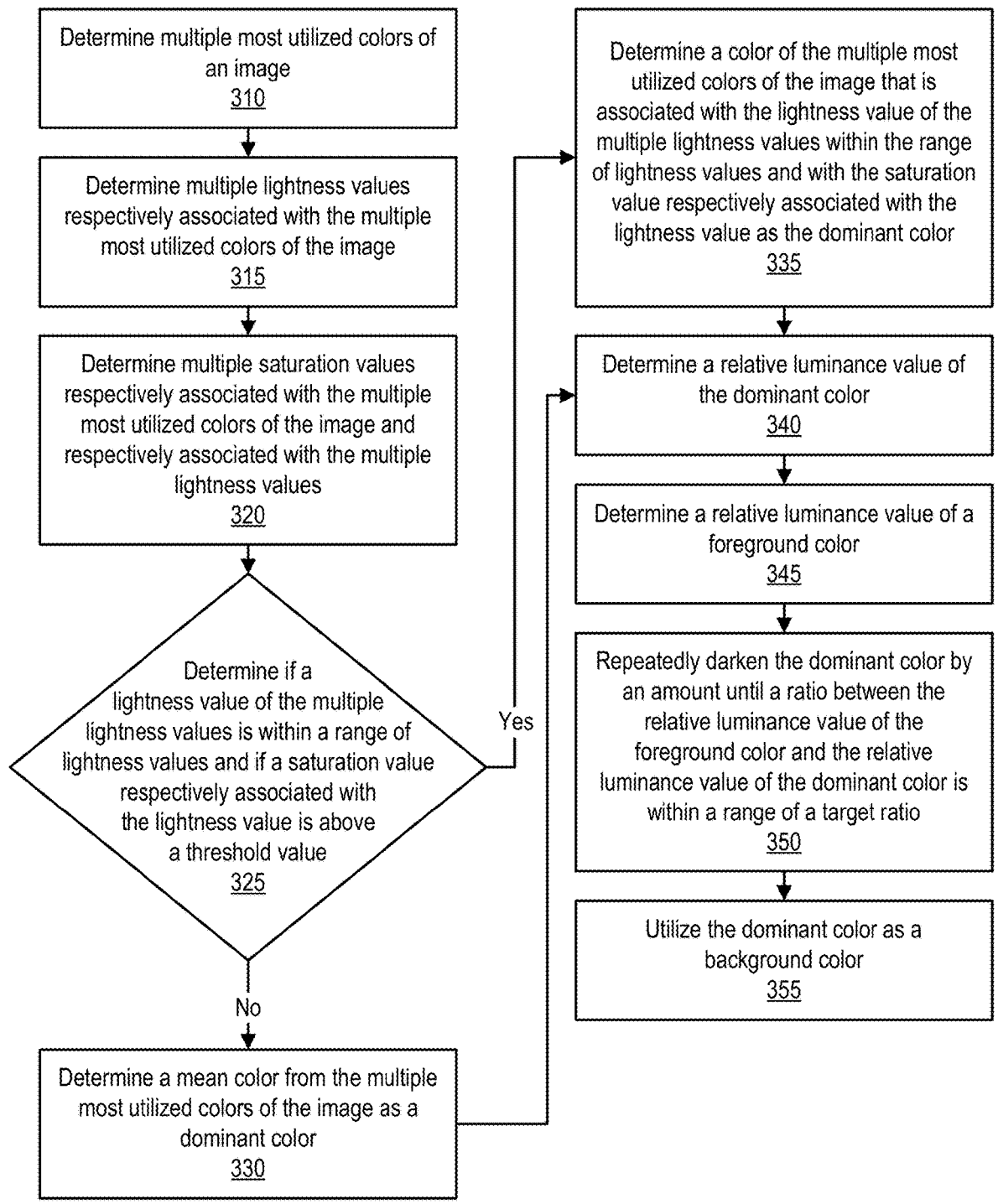
FIG. 3 illustrates an example of a method, according to one or more embodiments.

Turning now to FIG. 3, an example of a method is illustrated. At 310, multiple most utilized colors of an image may be determined. For example, a number of most utilized colors of image 160 may be determined. For instance, sixteen most utilized colors of an image may be determined. At 315, multiple lightness values respectively associated with the multiple most utilized colors of the image may be determined. In one or more embodiments, determining a lightness value from a color may include utilizing a mapping of red, green, and blue values of the color. In one example, determining a lightness value from a color may include determining an arithmetic mean of the red, green, and blue values of the color. In another example, determining a lightness value from a color may include determining an arithmetic mean of a sum of a maximum of the red, green, and blue values of the color and a minimum of the red, green, and blue values.

At 320, multiple saturation values respectively associated with the multiple most utilized colors of the image and respectively associated with the multiple lightness values may be determined. In one or more embodiments, saturation of a color may be determined by a combination of light intensity and how much it is distributed across a spectrum of different wavelengths. For example, a saturation value may be a colorfulness of a color judged in proportion to its brightness. For instance, saturation may provide an effect that may be perceived as freedom from whitishness of light coming from the color. In one or more embodiments, a saturation value associated with a color may be determined to be zero if a lightness associated the color is zero. In one or more embodiments, a saturation value associated with a color may be determined to be zero if a lightness associated the color is one. In one or more embodiments, saturation in a HSL (Hue Saturation Lightness) model may be $$\frac{\max(R, G, B) - \min(R, G, B)}{1 - |\max(R, G, B) - \min(R, G, B) - 1|}.$$

At 325, it may be determined if a lightness value of the multiple lightness values is within a range of lightness values and if a saturation value respectively associated with the lightness value is above a threshold value. In one or more embodiments, the range of lightness values may be from ninety (90) to one hundred and eighty (180). In one or more embodiments, other ranges may be utilized. In one or more embodiments, the threshold value may be fifty (50). In one or more embodiments, other threshold values may be utilized.

If the lightness value of the multiple lightness values is not within the range of lightness values or if the saturation value respectively associated with the lightness value is not above the threshold value, a mean color from the multiple most utilized colors of the image as a dominant color may be determined, at 330. In one example, determining a mean color from the multiple most utilized colors of the image as a dominant color may include determining an arithmetic mean of the multiple most utilized colors of the image as a dominant color. In another example, determining a mean color from the multiple most utilized colors of the image as a dominant color may include determining a geometric mean of the multiple most utilized colors of the image as a dominant color.

If the lightness value of the multiple lightness values is within the range of lightness values and if the saturation value respectively associated with the lightness value is above the threshold value, a color of the multiple most utilized colors of the image that is associated with the lightness value of the multiple lightness values within the range of lightness values and with the saturation value respectively associated with the lightness value may be determined as the dominant color, at 335.

At 340, a relative luminance value of the dominant color may be determined. In one or more embodiments, determining a relative luminance value from a color may include utilizing normalized red, green, and blue values of the color. For example, color values of R, G, and B may be normalized with respect to two hundred and fifty-five (255) (e.g., color values of R, G, and B may be eight-bit values). In one instance, $R_N = R/255$. In a second instance, $G_N = G/255$. In another instance, $B_N = B/255$. In one or more embodiments, determining a relative luminance value from a color may include determining a sum of a product of 0.2126 and $R_P$, a product of 0.7152 and $G_P$, and a product of 0.0722 and $B_P$. In one example, $R_P$ may be $R_N$ divided by 12.92 if $R_N$ is less than or equal to $K_0$; otherwise, $R_P$ may be $((R_N + 0.055)/1.055)^{2.4}$. For instance, $$R_P = \begin{cases} \frac{R_N}{12.92} & \text{if } R_N \le K_0 \\ \left(\frac{R_N + 0.055}{1.055}\right)^{2.4} & \text{otherwise} \end{cases}.$$

$K_0$ may be a constant. $K_0$ may be chosen based at least on an implementation, e.g., $K_0$ may be 0.03928, 0.04045, etc.

In a second example, $G_P$ may be $G_N$ divided by 12.92 if $G_N$ is less than or equal to $K_0$; otherwise $G_P$ may be $((G_N + 0.055)/1.055)^{2.4}$. For instance, $$G_P = \begin{cases} \frac{G_N}{12.92} & \text{if } G_N \le K_0 \\ \left(\frac{G_N + 0.055}{1.055}\right)^{2.4} & \text{otherwise} \end{cases}.$$

$K_0$ may be a constant. $K_0$ may be chosen based at least on an implementation, e.g., $K_0$ may be 0.03928, 0.04045, etc. In another example, $B_P$ may be $B_N$ divided by 12.92 if $B_N$ is less than or equal to $K_0$; otherwise $B_P$ may be $((B_N + 0.055)/1.055)^{2.4}$. For instance, $$B_P = \begin{cases} \frac{B_N}{12.92} & \text{if } B_N \le K_0 \\ \left(\frac{B_N + 0.055}{1.055}\right)^{2.4} & \text{otherwise} \end{cases}.$$

$K_0$ may be a constant. $K_0$ may be chosen based at least on an implementation, e.g., $K_0$ may be 0.03928, 0.04045, etc.

At 345, a relative luminance value of a foreground color may be determined. In one or more embodiments, relative luminance value of the foreground color may be determined via one or more methods, one or more processes, and/or one or more systems described herein. In one or more embodiments, the foreground color may be or include a font color. In one example, the foreground color may be or include a font color utilized in GUI element 170. In another example, the foreground color may be or include a font color utilized in GUI element 172.

At 350, the dominant color may be repeatedly darkened by an amount until a ratio between the relative luminance value of the foreground color ($RL_{foreground}$) and the relative luminance value of the dominant color ($RL_{background}$) is within a range of a target ratio. For example, the dominant color may be repeatedly darkened by an amount until $$\frac{RL_{foreground}}{RL_{background}} \approx \text{Target Ratio}.$$

In one instance, the target ratio may be four and one half (4.5). In another instance, the ratio between the relative luminance value of the foreground color and the relative luminance value of the dominant color may be four and one half to one (4.5:1). In one or more embodiments, $RL_{foreground}$ may be modified by a constant and/or $RL_{background}$ may be modified by a constant. For example, the dominant color may be repeatedly darkened by an amount until $$\frac{RL_{foreground} + 0.05}{RL_{background} + 0.05} \approx \text{Target Ratio.}$$

For instance, the target ratio may be four and one half (4.5). In one or more embodiments, the foreground color may be or include a font color. In one example, the foreground color may be or include a font color associated with text of GUI element 170. In another example, the foreground color may be or include a font color associated with text of GUI element 172.

In one or more embodiments, other target ratios between the relative luminance value of the foreground color and the relative luminance value of the dominant color may be utilized. In one or more embodiments, a range of a target ratio may be a percentage. For example, the dominant color may be repeatedly darkened by the amount until the ratio between the relative luminance value of the foreground color and the relative luminance value of the dominant color is within a percentage of the target ratio. In one or more embodiments, the dominant color may be repeatedly darkened by an amount until a ratio between the relative luminance value of the foreground color and the relative luminance value of the dominant color is within a range of a target ratio utilizing an example of a method of darkening the dominant described with reference to FIG. 4.

At 355, the dominant color may be utilized as a background color. For example, utilizing the dominant color as the background color may include displaying glyphs of a font in a font color on a background with the dominant color as a background color. In one instance, the dominant color may provide a contrast for a font color of GUI element 170. In a second instance, background 180 may be or include the dominant color. In a third instance, the dominant color may provide a contrast for a font color of GUI element 172. In a fourth instance, background 182 may be or include the dominant color. In another instance, background 210 may be or include the dominant color.

In one or more embodiments, utilizing the dominant color may include displaying a GUI and/or a GUI element with a background of the dominant color. In one or more embodiments, a glyph may include an elemental symbol within an agreed set of symbols. For example, the set of symbols may be intended to represent readable characters. For instance, the set of symbols may be intended to represent readable character for a purpose of communicating information.

Figure 4:
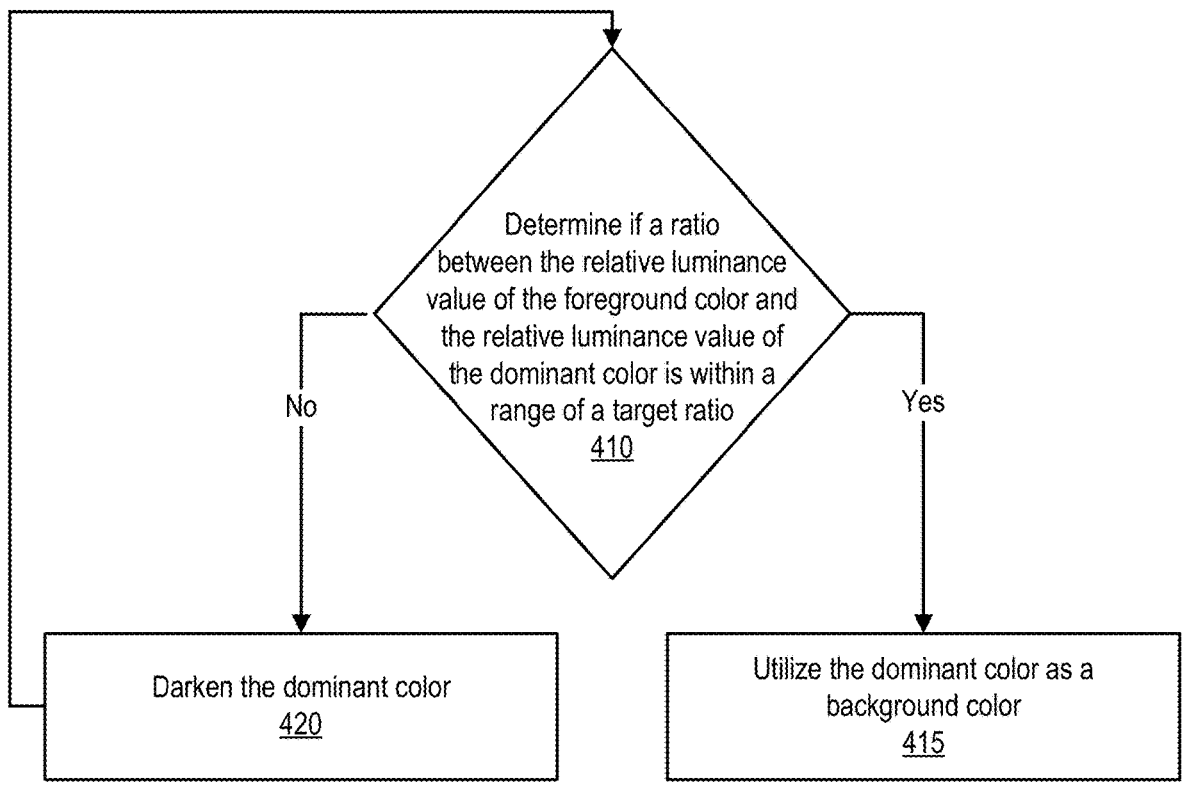
FIG. 4 illustrates an example of a method of darkening a dominant color, according to one or more embodiments.

Turning now to FIG. 4, an example of a method of darkening a dominant color is illustrated, according to one or more embodiments. At 410, it may be determined if a ratio between the relative luminance value of the foreground color and the relative luminance value of the dominant color is within a range of a target ratio the dominant color. For example, it may be determined if $$\frac{RL_{foreground}}{RL_{background}} \approx \text{Target Ratio.}$$

In one instance, the target ratio may be four and one half (4.5). In another instance, the ratio between the relative luminance value of the foreground color and the relative luminance value of the dominant color may be four and one half to one (4.5:1). In one or more embodiments, $RL_{foreground}$ may be modified by a constant and/or $RL_{background}$ may be modified by a constant. For example, it may be determined if $$\frac{RL_{foreground} + 0.05}{RL_{background} + 0.05} \approx \text{Target Ratio.}$$

For instance, the target ratio may be four and one half (4.5). In one or more embodiments, the foreground color may be or include a font color. In one example, the foreground color may be or include a font color associated with text of GUI element 170. In another example, the foreground color may be or include a font color associated with text of GUI element 172.

If the ratio between the relative luminance value of the foreground color and the relative luminance value of the dominant color is within the range of the target ratio, the dominant color may be utilized as the background color for the font color, at 415. For example, utilizing the dominant color as the background color for the font color may include displaying glyphs of a font in the font color on a background with the dominant color as the background color. In one instance, the dominant color may be utilized as the background color for the font color of GUI element 170. In another instance, the dominant color may be utilized as the background color for the font color of GUI element 172. In one or more embodiments, utilizing the dominant color may include displaying a GUI and/or a GUI element with a background of the dominant color.

If the ratio between the relative luminance value of the foreground color and the relative luminance value of the dominant color is not within the range of the target ratio, the dominant color may be darkened, at 420. In one or more embodiments, darkening the dominant color may include reducing a relative luminance value associated with the dominant color. For example, the relative luminance value associated with the dominant color may be reduced by an amount. For instance, $RL_{background}$ may be reduced by an amount. In one or more embodiments, darkening the dominant color may include reducing R, G, and B values by an amount. In one example, R, G, and B values may be eight-bit values, and darkening the dominant color may include reducing each of the R, G, and B values by one. For instance, one may be subtracted from each of the R, G, and B values. In another example, R, G, and B values may be eight-bit values, and darkening the dominant color may include reducing each of the R, G, and B values by an integer number. For instance, the integer number may be subtracted from each of the R, G, and B values. In one or more embodiments, method element 350 of FIG. 3 may include method elements 410 and 420. In one or more embodiments, method element 355 of FIG. 3 may include method element 415.

Figure 5:
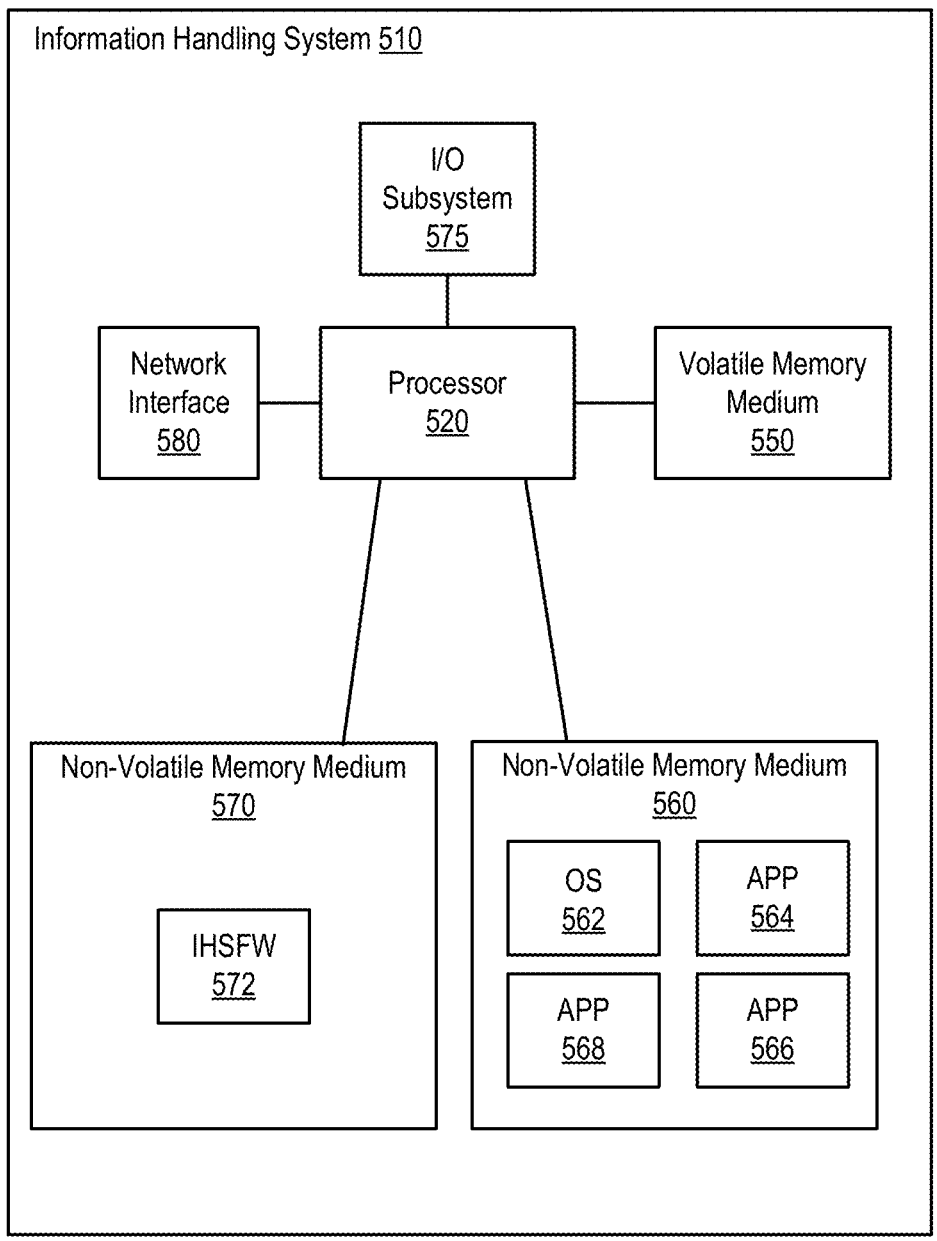
FIG. 5 illustrates an example of an information handling system, according to one or more embodiments.

Turning now to FIG. 5, an example of an information handling system is illustrated, according to one or more embodiments. An information handling system (IHS) 510 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 510 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 510 may include or have a form factor of that of or similar to one or more of a laptop, a notebook, a telephone, a tablet, and a PDA, among others. For example, a portable IHS 510 may be readily carried and/or transported by a user (e.g., a person). In one or more embodiments, components of IHS 510 may include one or more storage devices, one or more communications ports for communicating with external devices as well as various input and output (I/O) devices, such as a keyboard, a mouse, and a video display (e.g., display 110), among others. In one or more embodiments, IHS 510 may include one or more buses operable to transmit communication between or among two or more hardware components. In one example, a bus of IHS 510 may include one or more of a memory bus, a peripheral bus, and a local bus, among others. In another example, a bus of IHS 510 may include one or more of a Micro Channel Architecture (MCA) bus, an Industry Standard Architecture (ISA) bus, an Enhanced ISA (EISA) bus, a Peripheral Component Interconnect (PCI) bus, Hyper-Transport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 510 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 510 may include a processor 520, a volatile memory medium 550, non-volatile memory media 560 and 570, an I/O subsystem 575, and a network interface 580. As illustrated, volatile memory medium 550, non-volatile memory media 560 and 570, I/O subsystem 575, and network interface 580 may be communicatively coupled to processor 520.

In one or more embodiments, one or more of volatile memory medium 550, non-volatile memory media 560 and 570, I/O subsystem 575, and network interface 580 may be communicatively coupled to processor 520 via one or more buses, one or more switches, and/or one or more root complexes, among others. In one example, one or more of volatile memory medium 550, non-volatile memory media 560 and 570, I/O subsystem 575, and network interface 580 may be communicatively coupled to processor 520 via one or more PCI-Express (PCIe) root complexes. In another example, one or more of an I/O subsystem 575 and a network interface 580 may be communicatively coupled to processor 520 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 550 may include volatile storage such as, for example, RAM, DRAM (dynamic RAM), EDO RAM (extended data out RAM), SRAM (static RAM), etc. One or more of non-volatile memory media 560 and 570 may include nonvolatile storage such as, for example, a read only memory (ROM), a programmable ROM (PROM), an erasable PROM (EPROM), an electrically erasable PROM, NVRAM (non-volatile RAM), ferroelectric RANI (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 580 may be utilized in communicating with one or more networks and/or one or more other information handling systems. In one example, network interface 580 may enable IHS 510 to communicate via a network utilizing a suitable transmission protocol and/or standard. In a second example, network interface 580 may be coupled to a wired network. In a third example, network interface 580 may be coupled to an optical network. In another example, network interface 580 may be coupled to a wireless network.

In one or more embodiments, network interface 580 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 520 may execute processor instructions in implementing one or more systems, one or more flowcharts, one or more methods, and/or one or more processes described herein. In one example, processor 520 may execute processor instructions from one or more of memory media 550-570 in implementing one or more systems, one or more flowcharts, one or more methods, and/or one or more processes described herein. In another example, processor 520 may execute processor instructions via network interface 580 in implementing one or more systems, one or more flowcharts, one or more methods, and/or one or more processes described herein.

In one or more embodiments, processor 520 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 520 may interpret and/or execute program instructions and/or process data stored locally (e.g., via memory media 550-570 and/or another component of IHS 510). In another example, processor 520 may interpret and/or execute program instructions and/or process data stored remotely (e.g., via a network storage resource).

In one or more embodiments, I/O subsystem 575 may represent a variety of communication interfaces, graphics interfaces, video interfaces, user input interfaces, and/or peripheral interfaces, among others. For example, I/O subsystem 575 may include one or more of a touch panel and a display adapter, among others. In one instance, a touch panel may include circuitry that enables touch functionality in conjunction with a display (e.g., display 110) that is driven by a display adapter. In another instance, IHS 510 may be coupled to display 110. In one or more embodiments, IHS 510 may display GUI 120 via display 110.

As shown, non-volatile memory medium 560 may include an operating system (OS) 562, and applications (APPs) 564-568. In one or more embodiments, one or more of OS 562 and APPs 564-568 may include processor instructions executable by processor 520. In one example, processor 520 may execute processor instructions of one or more of OS 562 and APPs 564-568 via non-volatile memory medium 560. In another example, one or more portions of the processor instructions of the one or more of OS 562 and APPs 564-568 may be transferred to volatile memory medium 550, and processor 520 may execute the one or more portions of the processor instructions of the one or more of OS 562 and APPs 564-568 via volatile memory medium 550.

As illustrated, non-volatile memory medium 570 may include information handling system firmware (IHSFW) 572. In one or more embodiments, IHSFW 572 may include processor instructions executable by processor 520. For example, IHSFW 572 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 520 may execute processor instructions of IHSFW 572 via non-volatile memory medium 570. In another instance, one or more portions of the processor instructions of IHSFW 572 may be transferred to volatile memory medium 550, and processor 520 may execute the one or more portions of the processor instructions of IHSFW 572 via volatile memory medium 550.

In one or more embodiments, processor 520 and one or more components of IHS 510 may be included in a system-on-chip (SoC). For example, the SoC may include processor 520 and a platform controller hub (not specifically illustrated).

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
  at least one processor; and
  a memory medium, coupled to the at least one processor, that stores instructions executable by the at least one processor, which when executed by the at least one processor, cause the information handling system to:
    determine a plurality of most utilized colors of an image;
    determine a plurality of lightness values respectively associated with the plurality of most utilized colors of the image;
    determine a plurality of saturation values respectively associated with the plurality of most utilized colors of the image and respectively associated with the plurality of lightness values;
    in response to determining that i) a lightness value of the plurality of lightness values is within a range of lightness values and that ii) a saturation value respectively associated with the lightness value is above a threshold value: determine a color of the plurality of most utilized colors of the image that is associated with the lightness value of the plurality of lightness values within the range of lightness values and with the saturation value respectively associated with the lightness value as a dominant color;
    in response to determining that i) the lightness value of the plurality of lightness values is not within the range of lightness values or that ii) the saturation value respectively associated with the lightness value is not above the threshold value: determine a mean color from the plurality of most utilized colors of the image as the dominant color;

repeatedly darken the dominant color by an amount until a ratio between a relative luminance value of a foreground color and a relative luminance value of the dominant color is within a range of a target ratio, including:
  i) modifying the relative luminance value of the foreground color by adding a first constant to the relative luminance value of the foreground color;
  ii) modifying the relative luminance value of the dominant color by adding a second constant to the relative luminance value of the dominant color; and
utilize the dominant color as a background color.

2. The system of claim 1, wherein, to utilize the dominant color as the background color, the instructions further cause the information handling system to display glyphs of a font in a font color on a background with the dominant color as the background color.

3. The system of claim 1, wherein the target ratio is four and one half to one.

4. The system of claim 1, wherein the instructions further cause the information handling system to:
  determine the relative luminance value of the dominant color; and
  determine the relative luminance value of the foreground color.

5. The system of claim 1, wherein, to utilize the dominant color as the background color, the instructions further cause the information handling system to utilize the dominant color for a border color of a border that surrounds the image.

6. A method, comprising:
  determining a plurality of most utilized colors of an image;
  determining a plurality of lightness values respectively associated with the plurality of most utilized colors of the image;
  determining a plurality of saturation values respectively associated with the plurality of most utilized colors of the image and respectively associated with the plurality of lightness values;
  in response to determining that i) a lightness value of the plurality of lightness values is within a range of lightness values and that ii) a saturation value respectively associated with the lightness value is above a threshold value: determining a color of the plurality of most utilized colors of the image that is associated with the lightness value of the plurality of lightness values within the range of lightness values and with the saturation value respectively associated with the lightness value as a dominant color;
  in response to determining that i) the lightness value of the plurality of lightness values is not within the range of lightness values or that ii) the saturation value respectively associated with the lightness value is not above the threshold value: determine a mean color from the plurality of most utilized colors of the image as the dominant color;
  repeatedly darkening the dominant color by an amount until a ratio between a relative luminance value of a foreground color and a relative luminance value of the dominant color is within a range of a target ratio, including:
    i) modifying the relative luminance value of the foreground color by adding a first constant to the relative luminance value of the foreground color;
    ii) modifying the relative luminance value of the dominant color by adding a second constant to the relative luminance value of the dominant color; and
  utilizing the dominant color as a background color.

7. The method of claim 6, wherein the utilizing the dominant color as the background color includes displaying glyphs of a font in a font color on a background with the dominant color as the background color.

8. The method of claim 6, wherein the target ratio is four and one half to one.

9. The method of claim 6, further comprising:
  determining the relative luminance value of the dominant color; and
  determining the relative luminance value of the foreground color.

10. The method of claim 6, wherein the utilizing the dominant color as the background color includes utilizing the dominant color for a border color of a border that surrounds the image.

11. A computer-readable non-transitory memory medium that includes instructions that, when executed by at least one processor of an information handling system, cause the information handling system to:
  determine a plurality of most utilized colors of an image;
  determine a plurality of lightness values respectively associated with the plurality of most utilized colors of the image;
  determine a plurality of saturation values respectively associated with the plurality of most utilized colors of the image and respectively associated with the plurality of lightness values;
  in response to determining that i) a lightness value of the plurality of lightness values is within a range of lightness values and that ii) a saturation value respectively associated with the lightness value is above a threshold value: determine a color of the plurality of most utilized colors of the image that is associated with the lightness value of the plurality of lightness values within the range of lightness values and with the saturation value respectively associated with the lightness value as a dominant color;
  in response to determining that i) the lightness value of the plurality of lightness values is not within the range of lightness values or that ii) the saturation value respectively associated with the lightness value is not above the threshold value: determine a mean color from the plurality of most utilized colors of the image as the dominant color;
  repeatedly darken the dominant color by an amount until a ratio between a relative luminance value of a foreground color and a relative luminance value of the dominant color is within a range of a target ratio, including:
    i) modifying the relative luminance value of the foreground color by adding a first constant to the relative luminance value of the foreground color;
    ii) modifying the relative luminance value of the dominant color by adding a second constant to the relative luminance value of the dominant color; and
  utilize the dominant color as a background color.

12. The computer-readable non-transitory memory medium of claim 11, wherein, to utilize the dominant color as the background color, the instructions further cause the information handling system to display glyphs of a font in a font color on a background with the dominant color as the background color.

13. The computer-readable non-transitory memory medium of claim 11, wherein the instructions further cause the information handling system to:
   determine the relative luminance value of the dominant color; and
   determine the relative luminance value of the foreground color.

14. The computer-readable non-transitory memory medium of claim 11, wherein, to utilize the dominant color as the background color, the instructions further cause the information handling system to utilize the dominant color for a border color of a border that surrounds the image.

* * * * *